United States Patent [19]
White et al.

[11] Patent Number: 4,825,957
[45] Date of Patent: May 2, 1989

[54] BREAKAWAY MECHANISM FOR A ROW MARKER

[75] Inventors: Gregory S. White, Moline; William E. Erickson, Milan, both of Ill.

[73] Assignee: Deere & Company, Moline, Ill.

[21] Appl. No.: 895,761

[22] Filed: Aug. 12, 1986

Related U.S. Application Data

[63] Continuation of Ser. No. 780,404, Sep. 25, 1985, abandoned, which is a continuation of Ser. No. 592,554, Mar. 23, 1984, abandoned.

[51] Int. Cl.[4] ............................................. A01B 39/14
[52] U.S. Cl. ................................... 172/126; 172/271; 403/2
[58] Field of Search ............... 172/271, 126, 127, 128, 172/129, 130, 131, 132, 311, 456; 403/2

[56] References Cited

U.S. PATENT DOCUMENTS

| | | | |
|---|---|---|---|
| 1,207,146 | 12/1916 | Dickinson | 172/271 |
| 1,214,974 | 2/1917 | Urban | 172/271 |
| 1,780,112 | 10/1930 | Bowman | . |
| 1,947,552 | 2/1934 | Huddle | 56/25 |
| 2,612,827 | 10/1952 | Bagette | 172/271 |
| 3,627,057 | 12/1971 | Hartwig | 172/271 |
| 3,922,104 | 11/1975 | McCullough | 403/2 |
| 4,147,305 | 4/1979 | Hunt | 239/167 |

FOREIGN PATENT DOCUMENTS

| | | |
|---|---|---|
| 827201 | 7/1975 | Belgium . |
| 68104600 | 6/1981 | Fed. Rep. of Germany . |
| GB82/00010 | 8/1982 | PCT Int'l Appl. . |
| 671797 | 7/1952 | United Kingdom . |

OTHER PUBLICATIONS

John Deere Operator's Manual 7000 Conservation 4 Row and 6 Row Narrow Max—Emerge Drawn Planters, pp. 27 and 96, 5-1982.

Primary Examiner—Richard J. Johnson
Attorney, Agent, or Firm—Henderson & Sturm

[57] ABSTRACT

An improved breakaway assembly for preventing damage to markers for agricultural equipment when such markers encounter obstacles during use. The improved breakaway assembly includes an elongated member for holding the marker in place, imparting only tension forces onto such elongated member and minimizing the amount of shearing forces typically encountered by prior art shear pins. The elongated member is generally positioned tangentially to an arc formed by rotation of the point of attachment of such elongated member about the vertical axis on which the marker pivots when an obstruction is encountered.

26 Claims, 3 Drawing Sheets

BREAKAWAY MECHANISM FOR A ROW MARKER

This is a continuation of co-pending application Ser. No. 780,404 filed Sept. 25, 1985, abandoned, which is a continuation of Ser. No. 592,554 filed Mar. 23, 1984, abandoned.

TECHNICAL FIELD

The present invention relates to field markers for attachment to agricultural implements, and more particularly to an apparatus for preventing damage to such field markers in the event that an unexpected obstruction is encountered by such field markers.

BACKGROUND ART

Row markers for agricultural implements, such as planters or the like, are utilized to float on the contour of the ground and provide a continuous visible marking that aids the operator in guiding the implement during successive rounds through the field. Since the outermost end of these markers is typically a considerable distance from the operator of the agricultural implement, it is not uncommon that such markers, from time to time, hit fences, small trees, or other obstacles found in fields, thereby damaging either the marker itself and/or such obstacles. Consequently, breakaway assemblies have been devised for such markers for permitting the marker to rotate about the vertical axis, away from the obstacle, but still remaining attached to the implement and in an undamaged condition.

A common problem with this type of apparatus is commonly referred to as "nuisance" failures. These typically occur due to fatique on the breakaway bolt, or some other weakness in the breakaway assembly. Since nearly every planter having markers thereon is equipped with breakaway protection, the down time associated with such "nuisance" failures can be extremely significant.

Prior art breakaway systems have typically provided a marker system which has the marker pivotally attached along a vertical axis to the frame of the implement and a shear pin is provided forwardly of such vertical pivot point for preventing such rotation unless the force from hitting an obstruction is so great as to break the shear pin holding it from such rotation. The prior art shear pins or bolts for preventing such rotation have heretofore been disposed in such a manner that they are sheared off when an obstruction is encountered by the marker. The problem with using a shear pin is that cyclic bending will continually occur during working conditions of the marker and this cyclic bending contributes to premature failure of the shear pin, thereby causing the aforementioned "nuisance" failures.

Consequently, there is a need for breakaway protection for markers which prevents cyclic bending of the pin or bolt, thereby reducing breakaways or "nuisance" failures as much as possible.

DISCLOSURE OF THE INVENTION

The present invention relates to an improved breakaway assembly for preventing damage to markers for agricultural equipment when such markers encounter obstacles during use. The improved breakaway assembly includes an elongated member for holding the marker in place, imparting only tension force onto such elongated member and minimizing the amount of shearing forces typically encountered by prior art shear pins. The elongated member is generally positioned tangentially to an arc formed by rotation of the point of attachment of such elongated member about the vertical axis on which the marker pivots when an obstruction is encountered.

An object of the present invention is to provide an improved breakaway protection for field markers on agricultural equipment.

Another object of the present invention is to provide a breakaway assembly for field markers which reduces cyclic bending and cyclic tensile load which can result in a premature failure of the breakaway assembly.

Other objects, advantages and novel features of the present invention will become apparent from the following detailed description of the invention when considered in conjunction with the accompanying drawings.

BEST MODE FOR CARRYING OUT THE INVENTION

Figure 1:
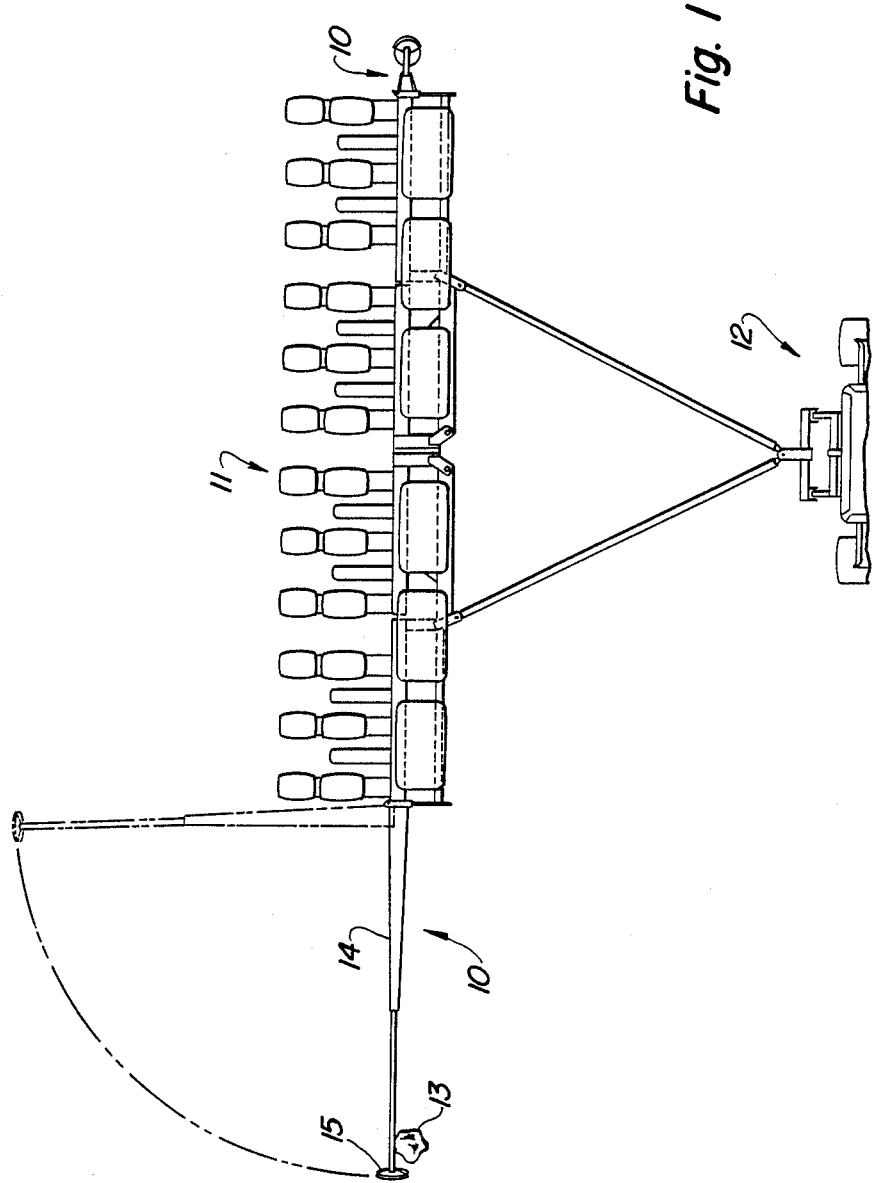
FIG. 1 is a plan view of a planter apparatus having field markers attached at each end thereof.

Referring now to the drawings wherein like reference numerals designate identical or corresponding parts throughout the several views, FIG. 1 shows a marker (10) constructed in accordance with the present invention attached to a planter (11), which planter (11) is attached to an agricultural tractor (12) in a conventional fashion.

Figure 2:
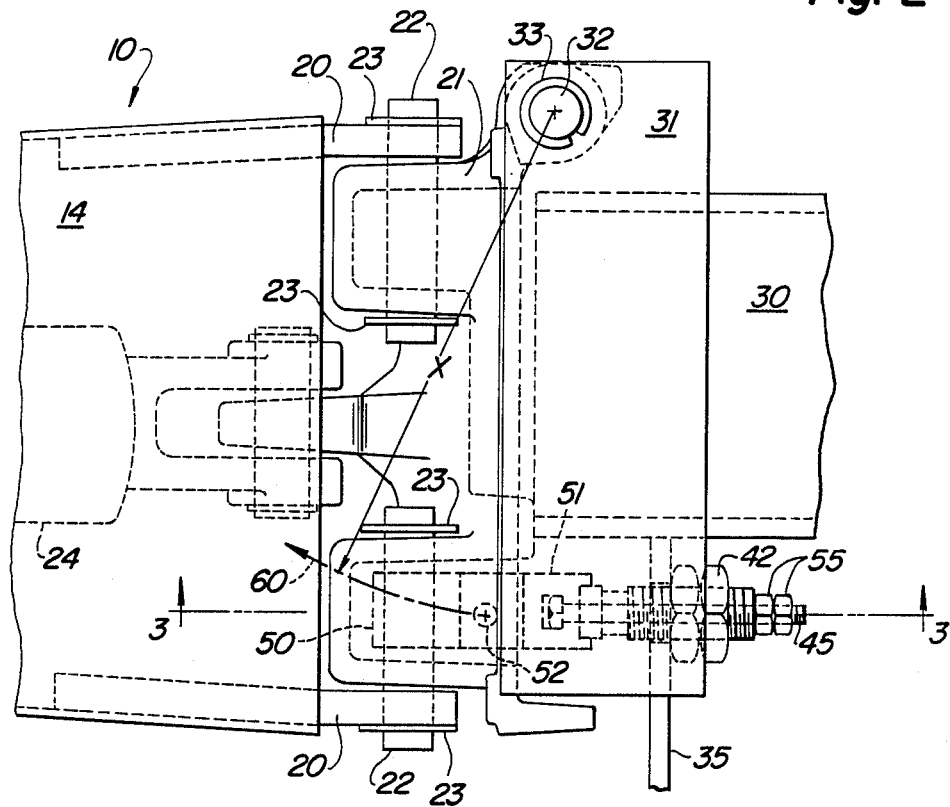
FIG. 2 is an enlarged detailed view of a breakaway apparatus for permitting field markers to avoid being damaged by pivoting rearwardly when such markers encounter an obstruction in the field.
Figure 3:
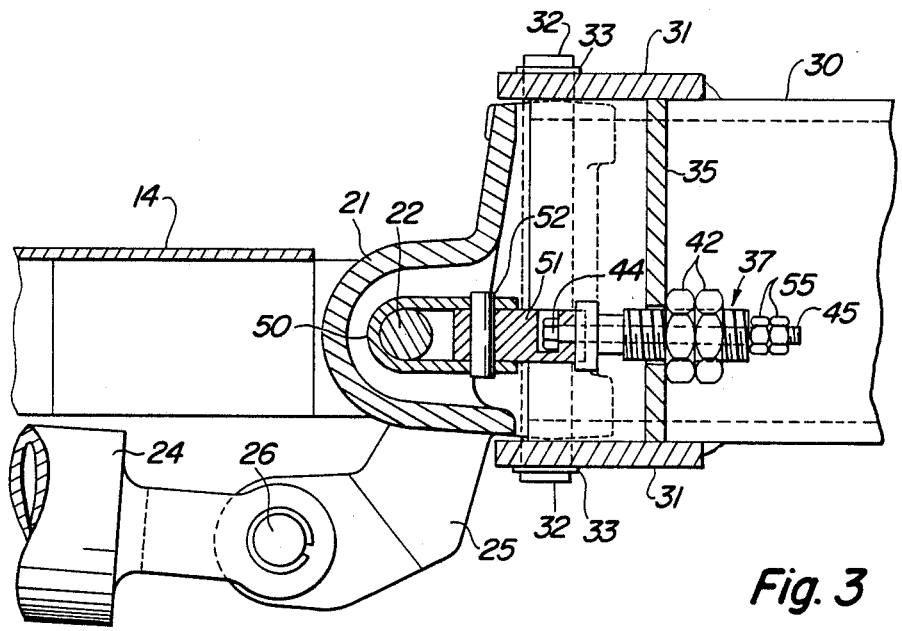
FIG. 3 is a cross-sectional view taken along line 3—3 of FIG. 2.
Figure 4:
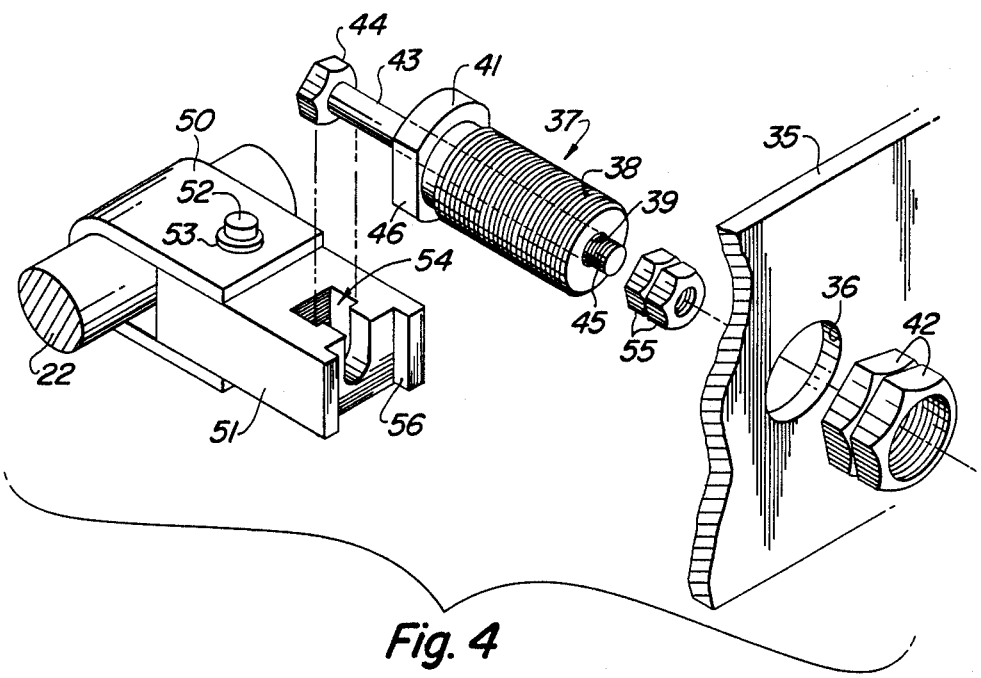
FIG. 4 is an enlarged perspective view of the improved breakaway assembly of the present invention.

In FIG. 1, it is noted that an obstruction (13), such as a small tree or rock or the like, has been encountered by the field marker (10) and the field marker (10) has been designed so that instead of bending the field marker (10), it will break away and pivot to the position shown in dashed lines in FIG. 1. Then once the planter (11) is moved to a position wherein the obstruction (13) is no longer in the way, the field marker (10) can be returned to the position shown in solid lines in FIG. 1. The structure for permitting this aforementioned function is shown in detail in FIGS. 2–4.

The marker (10) includes a support arm (14) having a disk blade (15) rotatably attached to the end thereof, as is conventional in this art. The support arm (14) has a pair of hinge members (20) rigidly attached thereto, such as by welding, and these hinge members (20) have openings therein which are in alignment. A first hinge assembly member (21) has openings therethrough which can be brought into alignment with the openings in the hinge members (20) to receive a pair of pins (22), which are held in place by split rings (23).

The connection of the first pivot mechanism (21) to the arm member (14) by the pins (22) permits rotation of the support arm (14) around the axis of pins (22). Consequently, when it is decided to use the marker, a hydraulic cylinder (24) is shortened to cause lowering of the support arm (14). A link member (25) extends from the first pivot mechanism (21) and is pivotally attached to the hydraulic cylinder (24) by a pivot pin (26). When it is desired to raise the support arm (14) of the marker (10), the hydraulic cylinder (24) is lengthened to cause the support arm (14) to be raised to the position shown in FIG. 1 on the right side of the planter (11) as shown in FIG. 1.

The first pivot assembly including the member (21) is, in turn, pivotally attached to a frame (30) of the planter (11). This pivotal attachment is accomplished by use of a pair of brackets (31) which are welded at the top and bottom of the frame (30). Aligned openings are formed in the brackets (31) for receiving a vertical pin (32) therethrough, which vertical pin (32) also extends through an opening in an extension of the bracket (31), thereby permitting the first pivot mechanism (21) and thereby the support arm (14) of the marker (10) to be pivoted about the vertical axis of pin (32).

When the marker (10) is in use in the field, it must be held against rotation about the vertical axis of pin (32), except in emergency situations such as when the marker (10) hits an obstruction or the like. The breakaway structure for holding the support arm (14) against rotation about the vertical axis of pin (32) is shown in detail in FIG. 4. A plate (35) is rigidly attached to the frame (30) of the planter, for example by welding, and is also rigidly attached in the same manner to the brackets (31) for reasons which will be disclosed below. An opening (36) in the plate (35) is of the size just large enough to receive a sleeve (37). This sleeve (37) has threads (38) disposed along a substantial length thereof and an opening (39) is disposed centrally thereof. The sleeve (37) also has an enlarged head (41) on one end thereof.

An elongated member or bolt (43) is placed through the opening (39) in the sleeve (37), and this elongated member (43) has an enlarged head (44) on one end thereof and threads (45) on the other end thereof. A U-shaped clevis member (50) is disposed around the hinge pin (22), as is shown clearly in FIGS. 3 and 4.

A block member (51) is pivotally attached to the clevis (50) by a pin (52) extending through aligned openings in the clevis (50), and through an opening in the block (51). The pin (52) is held in place by split ring members (53) on the top and bottom portions thereof.

A slot (54) is disposed in one end of the block (51) for receiving the enlarged portion (44) of the elongated member (43), and also for receiving the enlarged head (41) on the sleeve (37). As shown most clearly in FIG. 4, the enlarged portion (44) of the elongated member (43) engages the seat formed at the interior end of the slot (54), and the abutment surfaces (46) on the enlarged head (41) engage the sleeve seat (56) formed at the outer end of the slot (54). To install the sleeve and breakaway pin for elongated member (43), threaded nut members (55) are utilized to engage the threads (45) on the elongated member (43) and these nuts (55) are torqued down to preload the elongated member (43) at a predetermined level on the sleeve (37) and against the slot (54) formed in the block (51). The tightening step includes tensioning the elongated member (43) beyond the cyclic tension range. Once that has been accomplished, then the support arm (14) can be pivoted about the vertical axis of the pin (32) so as to cause the sleeve (37) to pass through the opening (36) in plate (35). Once that is done, then the threaded nuts (42) are screwed onto the threads (38) of the sleeve (37) to a tightness to prevent any pivoting at all about the axis of pin (32).

It is noted that when the marker (10) encounters the obstruction (13), the pivoting force will be imparted into the arm (14), tending to pivot it towards the position shown in dashed lines in FIG. 1. When the arm (14) contacts the obstruction (13), a force applied in the direction indicated by the arow (60) (see FIG. 2), will be imparted to the bolt or elongated member (43) causing it to fracture. This force will generally be directed along an arc formed by a radius "x", represented by the distance between the axis of the vertical pin (32) and the axis of the vertical pin (52). The elongated member (43) is generally disposed such that the axis thereof is tangentially disposed with respect to an arc formed by rotating the axis of the pin (52) about the vertical axis of the pin (32). This particular relationship of elements prevents cyclic bending of the elongated member (43) and tends to resist the pivoting of the arm (14) with only tension forces applied to the elongated member (43). Also because of the particular structure used, very little, if any, shearing forces are applied to the elongated member (43) thereby preventing metal fatigue and premature failure.

It is believed to be clear that the preferred embodiment disclosed herein does indeed accomplish the afoementioned objects. Obviously, many modifications and variations of the present invention are possible in light of the above teachings. It is therefore to be understood that, within the scope of the appended claims, the invention may be practiced otherwise than as specifically described.

We claim:

1. In a row marker for use in conjunction with a soil working implement having a frame with a front and rear portion, a foldable support arm, first pivot means for pivotably attaching the support arm to the frame along a substantially horizontal axis, a marker attached to the end of a vertically foldable support arm, means operatively interconnecting the frame and the support arm for selectively moving the support arm between a raised position and a lowered working position thereof, second pivot means operatively attached to said first pivot means for pivotally attaching said first pivot means and thereby said support arm to said frame along a substantially vertical axis, and breakaway means operatively attached to said frame generally at a point of attachment forward of said second pivot means for releasably holding said support arm from pivoting about said vertical axis with respect to said frame; the improvement comprising:

said breakaway means including an elongated member, having a longitudinal axis, operatively connected to said frame, said longitudinal axis being substantially horizontally disposed and generally tangential to an arc formed by rotation of said point of attachment forward of said second pivot means about said vertical axis whereby when said marker or support arm hits an obstruction said support arm will tend to be pivoted about said substantially vertical axis and tension forces will be applied to said elongated member, and wherein said elongated member has a tensile strength of a predetermined amount to allow the elongated member to fracture before the support arm is damaged due to contact with such obstruction;

said breakaway means further comprising aperture means for effectively forming an opening in the frame and an elongated sleeve disposed in said opening, said sleeve having a hole through the longitudinal center thereof, said elongated member being disposed through said hole whereby a substantial portion of said elongated member will be encircled by said sleeve and whereby shearing forces applied to the elongated member from the sleeve due to vibration or the like will be minimized;

sleeve fastener means disposed on one side of said aperture means for releasably holding said sleeve into said opening, a portion on the other end of the sleeve being larger than said opening for preventing loss of the sleeve when the elongated member is fractured, said sleeve fastener means including threads on the outside of said sleeve and at least one matching threaded nut for engagement with said threads on the sleeve.

2. The apparatus of claim 1 including retaining means on said one side of said aperture means for releasably holding one end of said elongated member from being withdrawn from said sleeve hole.

3. The apparatus of claim 2 wherein said retaining means comprises threads on said one end of the elongated member and at least one threaded nut for being threadably received thereon.

4. The apparatus of claim 1 wherein the other end of said elongated member includes an enlarged portion thereon.

5. The apparatus of claim 4 wherein said breakaway means includes a bracket means pivotally attached to said first pivot means along a vertical axis for preventing substantial bending of the elongated member, and slot means disposed in said bracket means for receivably holding the enlarged portion of said elongated member.

6. The apparatus of claim 5 wherein said elongated member is in the shape of a bolt.

7. The apparatus of claim 6 including means on said bracket means and on the enlarged portion of said sleeve for preventing rotation of the sleeve in the opening in which it is disposed.

8. The apparatus of claim 1 wherein said breakaway means includes a bracket means operatively pivotally attached to said first pivot means along a vertical axis which extends through said point of attachment of said breakaway means to said first pivot means, said bracket means also being attached to said elongated member for preventing substantial bending of the elongated member when the marker or support arm hits an obstruction.

9. In an implement having a frame with a front and rear portion, a support arm, means for pivotably attaching the support arm to the frame along a first axis, and breakaway means operatively attached to said frame generally at a point of attachment forward of said pivot means for releasably holding said support arm from pivoting about said first axis with respect to said frame; the improvement comprising:

said breakaway means including an elongated member, having a longitudinal axis, operatively connected to said frame, said longitudinal axis being substantially perpendicularly disposed with respect to said first axis and generally tangential to an arc formed by rotation of said point of attachment about said first axis whereby when said support arm hits an obstruction said support arm will tend to be pivoted about said first axis and tension forces will be applied to said elongated member, and wherein said elongated member has a tensile strength of a predetermined amount to allow the elongated member to fracture before the support arm is damaged due to contact with such obstruction;

said breakaway means further comprising aperture means for effectively forming an opening in the frame and an elongated sleeve disposed in said opening, said sleeve having a hole therethrough, said elongated member being disposed through said hole whereby a substantial portion of said elongated member will be encircled by said sleeve and whereby shearing forces applied to the elongated member from the sleeve due to vibration or the like will be minimized;

sleeve fastener means disposed on one side of side aperture means for releasably holding said sleeve into said opening, a portion on the other end of the sleeve being larger than said opening for preventing loss of the sleeve when the elongated member is fractured, said sleeve fastener means including threads on the outside of said sleeve and at least one matching threaded nut for engagement with said threads on the sleeve.

10. The apparatus of claim 9 including retaining means on said one side of said aperture means for releasably holding one end of said elongated member from being withdrawn from said sleeve hole.

11. The apparatus of claim 10 wherein said retaining means comprises threads on said one end of the elongated member and at least one threaded nut for being threadably received thereon.

12. The apparatus of claim 9 wherein the other end of said elongated member includes an enlarged portion thereon.

13. The apparatus of claim 12 wherein said breakaway means includes a bracket means pivotally attached to said frame for preventing substantial bending of the elongated member, and slot means disposed in said bracket means for receivably holding the enlarged portion of said elongated member.

14. The apparatus of claim 13 wherein said elongated member is in the shape of a bolt.

15. The apparatus of claim 14 including means on said bracket means and on the enlarged portion of said sleeve for preventing rotation of the sleeve in the opening in which it is disposed.

16. The apparatus of claim 9 wherein said breakaway means includes a bracket means operatively pivotally attached to said frame, said bracket means also being attached to said elongated member for preventing substantial bending of the elongated member when the support arm hits an obstruction.

17. In an implement having a frame, a support arm, means for pivotably attaching the support arm to the frame along a first axis, and breakaway means operatively attached to said frame generally at a point of attachment forward of said pivot means for releasably holding said support arm from pivoting about said first axis with respct to said frame; the improved breakaway means comprising:

an elongated member, having a longitudinal axis, operatively connected to said frame, said longitudinal axis being substantially perpendicularly disposed with respect to said first axis and generally tangential to an arc formed by rotation of said point of attachment about said first axis whereby when said support arm hits an obstruction said support arm will tend to be pivoted about said first axis and tension forces will be applied to said elongated member, and wherein said elongated member has a tensile strength of a predetermined amount to allow the elongated member to fracture before the support arm is damaged due to contact with such obstruction;

aperture means for effectively forming an opening in the frame and an elongated sleeve disposed in said opening, said sleeve having a hole therethrough, said elongated member being disposed through said hole whereby a substantial portion of said elongated member will be encircled by said sleeve and whereby shearing forces applied to the elongated member from the sleeve due to vibration or the like will be minimized; and a bracket means operatively pivotally attached to said frame, said bracket means also being attached to said elongated member for preventing substantial bending of the elongated member when the support arm hits an obstruction, said bracket means including a block having a slot formed therein, said slot including a first seat area disposed to receive a portion of said elongated member and a second seat area disposed to receive a portion of said sleeve.

18. The apparatus of claim 17 including sleeve fastener means disposed on one side of said aperture means for releasably holding said sleeve into said opening.

19. The apparatus of claim 18 including a portion on the other end of the sleeve larger than said opening for preventing loss of the sleeve when the elongated member is fractured.

20. The apparatus of claim 19 wherein said sleeve fastener means comprises threads on the outside of said sleeve and at least one matching threaded nut for engagement with said threads on the sleeve.

21. The apparatus of claim 18 including retaining means on said one side of said aperture means for releasably holding one end of said elongated member from being withdrawn from said sleeve hole.

22. The apparatus of claim 21 wherein said retaining means comprises threads on said one end of the elongated member and at least one threaded nut for being threadably received thereon.

23. The apparatus of claim 18 wherein the other end of said elongated member includes an enlarged portion thereon.

24. The apparatus of claim 23 wherein said first seat area is disposed for receivably holding the enlarged portion of said elongated member.

25. The apparatus of claim 24 wherein said elongated member is in the shape of a bolt.

26. The apparatus of claim 25 including an abutment surface on the enlarged portion of said sleeve for engaging said second seat area and preventing rotation of the sleeve in the opening in which it is disposed.

* * * * *